United States Patent
Hori

(10) Patent No.: US 11,461,063 B2
(45) Date of Patent: Oct. 4, 2022

(54) CONTROL APPARATUS FOR DISPLAYING PRINT PREVIEW, CONTROL METHOD INCLUDING DISPLAY STEP OF DISPLAYING PRINT PREVIEW, AND STORAGE MEDIUM STORING PROGRAM THAT CAUSES COMPUTER TO FUNCTION AS UNITS OF CONTROL APPARATUS FOR DISPLAYING PRINT PREVIEW

(71) Applicant: CANON KABUSHIKI KAISHA, Tokyo (JP)

(72) Inventor: Daisuke Hori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/892,432

(22) Filed: Jun. 4, 2020

(65) Prior Publication Data
US 2020/0409637 A1    Dec. 31, 2020

(30) Foreign Application Priority Data
Jun. 28, 2019   (JP) .............................. JP2019-121706

(51) Int. Cl.
*G06F 3/12*    (2006.01)
(52) U.S. Cl.
CPC .......... *G06F 3/1256* (2013.01); *G06F 3/1208* (2013.01); *G06F 3/1251* (2013.01)
(58) Field of Classification Search
CPC ..... G06F 3/1256; G06F 3/1208; G06F 3/1251
USPC ..................................................... 358/1.15
See application file for complete search history.

(56) References Cited

U.S. PATENT DOCUMENTS

| | | | | |
|---|---|---|---|---|
| 7,936,465 B2* | 5/2011 | Fukunishi | ............ | H04N 1/3877 358/1.9 |
| 2004/0207869 A1* | 10/2004 | Endo | .................. | H04N 1/00347 358/1.15 |
| 2005/0052693 A1* | 3/2005 | Kadota | ................. | G06F 3/1245 358/1.15 |
| 2005/0099660 A1* | 5/2005 | Yada | .................. | H04N 1/32593 358/498 |

(Continued)

FOREIGN PATENT DOCUMENTS

| | | |
|---|---|---|
| JP | H05-185687 A | 7/1993 |
| JP | 2006-202112 A | 8/2006 |

OTHER PUBLICATIONS

Nov. 23, 2020 European Search Report in European Patent Appln. No. 20179741.2.

*Primary Examiner* — Allen H Nguyen
(74) *Attorney, Agent, or Firm* — Venable LLP

(57) ABSTRACT

A control apparatus has a display unit, a first changing unit and a second changing unit. The display unit displays a print preview showing a print medium on which a sheet region corresponding to a predetermined paper size is provided. The first changing unit changes, based on a setting in a first setting item being changed, an orientation of the sheet region in the print preview displayed by the display unit. The second changing unit changes a positional relationship among a multiple pages on the print medium shown by the print preview based on a setting in a second setting item being changed by a user. Orientations of the multiple pages and the positional relationship and a setting in a second setting item are changed based on a change, by a first changing unit, of the orientation of the sheet region having the multiple pages arranged therein.

24 Claims, 8 Drawing Sheets

(56) References Cited

U.S. PATENT DOCUMENTS

| | | | |
|---|---|---|---|
| 2011/0211892 A1* | 9/2011 | Yasuzaki | B41J 11/703 400/76 |
| 2013/0045851 A1* | 2/2013 | Hori | G06F 3/1204 493/405 |
| 2019/0004745 A1* | 1/2019 | Itai | G06F 3/125 |
| 2019/0347053 A1* | 11/2019 | Aoyama | G06F 3/1292 |

* cited by examiner

| PAGE SHAPE | ORIENTATION OF SHEET REGION | NUMBERS OF ROWS AND COLUMNS | LAYOUT DIRECTION IN DEFAULT DISPLAY FORM | EXAMPLE OF PREVIEW |
|---|---|---|---|---|
| VERTICALLY LONG SHAPE | PORTRAIT ORIENTATION | IDENTICAL | UPPER LEFT-TO-RIGHT DIRECTION | 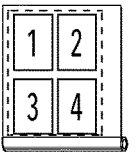 |
| | | NOT IDENTICAL | LOWER LEFT-TO-TOP DIRECTION | 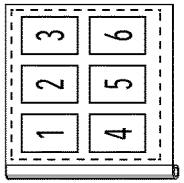 |
| | LANDSCAPE ORIENTATION | IDENTICAL | LOWER LEFT-TO-TOP DIRECTION |  |
| | | NOT IDENTICAL | UPPER LEFT-TO-RIGHT DIRECTION | 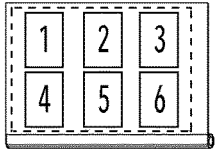 |
| HORIZONTALLY LONG SHAPE | PORTRAIT ORIENTATION | IDENTICAL | LOWER LEFT-TO-TOP DIRECTION | 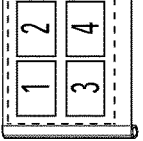 |
| | | NOT IDENTICAL | UPPER LEFT-TO-RIGHT DIRECTION | 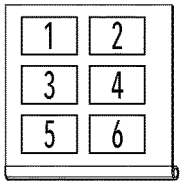 |
| | LANDSCAPE ORIENTATION | IDENTICAL | UPPER LEFT-TO-RIGHT DIRECTION | 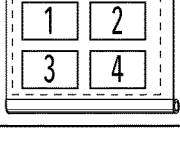 |
| | | NOT IDENTICAL | LOWER LEFT-TO-TOP DIRECTION | 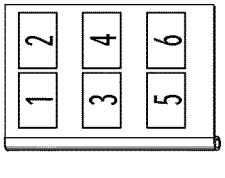 |

FIG.6

CONTROL APPARATUS FOR DISPLAYING PRINT PREVIEW, CONTROL METHOD INCLUDING DISPLAY STEP OF DISPLAYING PRINT PREVIEW, AND STORAGE MEDIUM STORING PROGRAM THAT CAUSES COMPUTER TO FUNCTION AS UNITS OF CONTROL APPARATUS FOR DISPLAYING PRINT PREVIEW

BACKGROUND OF THE INVENTION

Field of the Invention

The present invention relates to a control apparatus, control method and storage medium for performing a page layout printing.

Description of the Related Art

As one of the functions of a printer driver, there is a page layout printing function of collectively printing, on one sheet, the images of multiple pages generated with an application. In using the page layout printing function, a user can check how multiple pages are allocated to a sheet on a preview screen of a printer driver.

In a print system disclosed in Japanese Patent Laid-Open No. H05-185687 (1993), a page layout method for the purpose of reducing operation time in a publication process is disclosed.

In a case where multiple pages are allocated as described above, it is assumed that the user can set a relationship regarding page order of the multiple pages and their allocation positions. It is also assumed that on a print preview screen, the orientation of a region to which a page is allocated differs depending on print setting conditions. At this time, there is a case where the setting content (the setting of the relationship regarding page order and allocation positions) is not identical to the relationship regarding page order and allocation positions on the print preview screen.

In this case, there is a possibility that the user cannot appropriately grasp the setting content of the relationship regarding page order and page arrangement positions.

SUMMARY OF THE INVENTION

The present invention has been made to solve the above problem. Thus, an object of the present invention is to enable the user to easily recognize the setting content of the relationship regarding page order and page arrangement positions.

In a first aspect of the present invention, there is provided a control apparatus comprising: a display unit configured to display, on a display device, a print preview showing a print medium on which a sheet region corresponding to a predetermined paper size is provided; a first changing unit configured to change, based on a setting in a first setting item being changed, an orientation of the sheet region with respect to a predetermined direction of the print medium in the print preview displayed by the display unit; and a second changing unit configured to change, in a case where multiple pages are arranged in the sheet region, a positional relationship among the multiple pages on the print medium shown by the print preview based on a setting in a second setting item being changed by a user, wherein orientations of the multiple pages and the positional relationship among the multiple pages on the print medium and the setting in the second setting item are changed based on the change, by the first changing unit, of the orientation of the sheet region having the multiple pages arranged therein with respect to the predetermined direction of the print medium.

In a second aspect of the present invention, there is provided a control method comprising: a display step of displaying, on a display device, a print preview showing a print medium on which a sheet region corresponding to a predetermined paper size is provided; a first changing step of changing, based on a setting in a first setting item being changed, an orientation of the sheet region with respect to a predetermined direction of the print medium in the print preview displayed by the display step; and a second changing step of changing, in a case where multiple pages are arranged in the sheet region, a positional relationship among the multiple pages on the print medium shown by the print preview based on a setting in a second setting item being changed by a user, wherein orientations of the multiple pages and the positional relationship among the multiple pages on the print medium and the setting in the second setting item are changed based on the change, by the first changing step, of the orientation of the sheet region having the multiple pages arranged therein with respect to the predetermined direction of the print medium.

In a third aspect of the present invention, there is provided a non-transitory computer readable storage medium storing a program that causes a computer to function as units of a control apparatus, the control apparatus comprising: a display unit configured to display, on a display device, a print preview showing a print medium on which a sheet region corresponding to a predetermined paper size is provided; a first changing unit configured to change, based on a setting in a first setting item being changed, an orientation of the sheet region with respect to a predetermined direction of the print medium in the print preview displayed by the display unit; and a second changing unit configured to change, in a case where multiple pages are arranged in the sheet region, a positional relationship among the multiple pages on the print medium shown by the print preview based on a setting in a second setting item being changed by a user, wherein orientations of the multiple pages and the positional relationship among the multiple pages on the print medium and the setting in the second setting item are changed based on the change, by the first changing unit, of the orientation of the sheet region having the multiple pages arranged therein with respect to the predetermined direction of the print medium.

Further features of the present invention will become apparent from the following description of exemplary embodiments with reference to the attached drawings.

BRIEF DESCRIPTION OF THE DRAWINGS

FIG. 6 shows setting values and default layouts;

DESCRIPTION OF THE EMBODIMENTS

First Embodiment

In the present embodiment, a description will be given of a case where multiple pages having images generated with an application are subjected to page layout printing on a roll sheet by using layout software and printer drivers.

Figure 1:
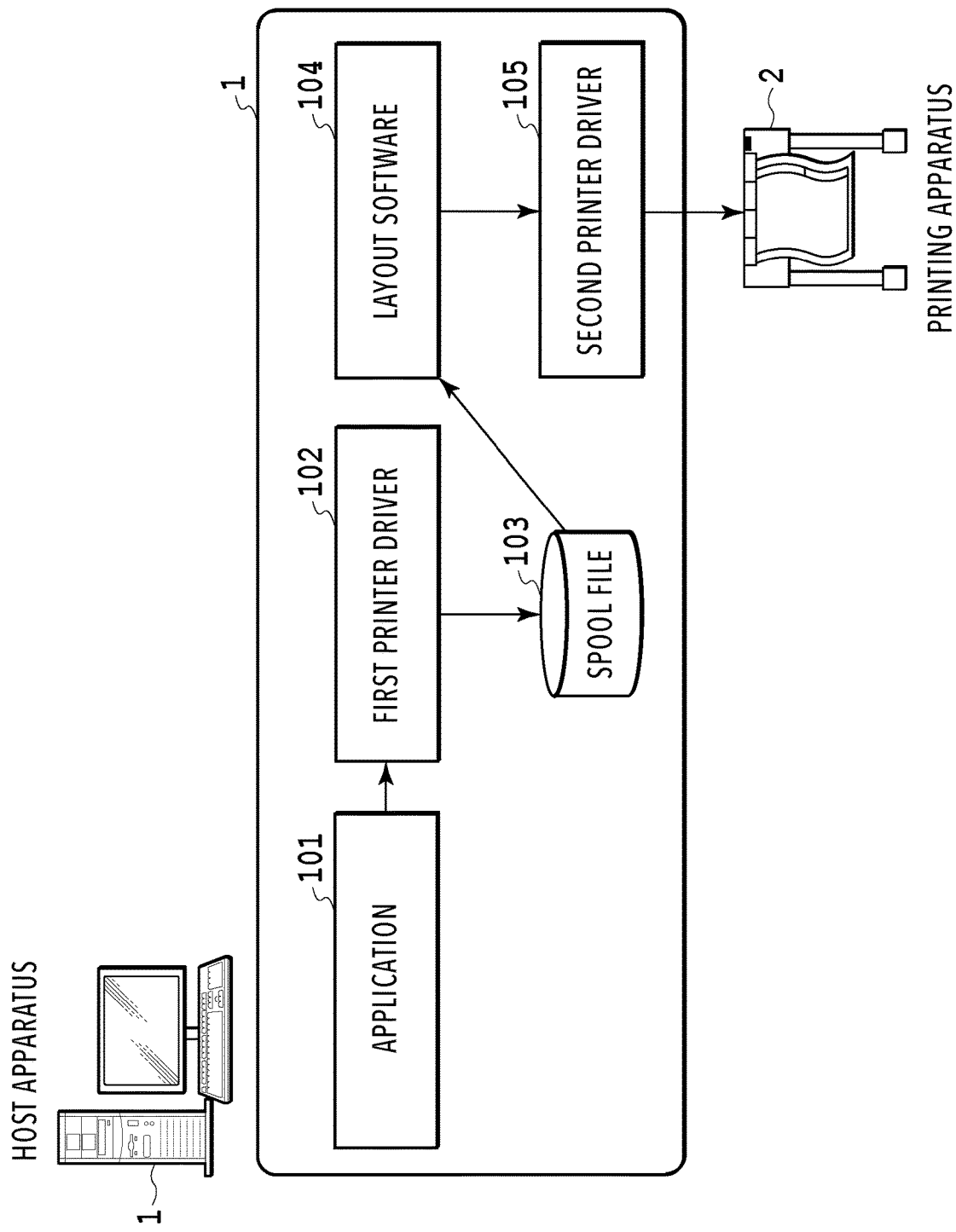
FIG. 1 is a configuration diagram of a print system.

FIG. 1 is a configuration diagram of a print system used in the present embodiment. The print system according to the present embodiment includes a host apparatus 1 and a printing apparatus 2 on which a roll sheet can be mounted. The host apparatus 1 is a personal computer or the like, and on the host apparatus 1, an application 101 capable of generating a printing target image, a first printer driver 102, layout software 104, and a second printer driver 105 are installed.

In a case where a user prints an image generated with the application 101, the user selects one printer driver (the first printer driver 102) and provides instructions to print an image via the selected printer driver. Upon transmission of a print command, the first printer driver 102 generates pieces of intermediate data respectively corresponding to multiple pages based on image data generated with the application 101 and stores the pieces of data as a spool file 103. Incidentally, the first printer driver 102 is a virtual printer driver that does not actually provide print instructions to the printing apparatus in an example shown in FIG. 1. However, the first printer driver 102 is installed on the host apparatus 1 as with a printer driver that actually controls a printing apparatus like the second printer driver 105 to be described later. Thus, even without issuing any special command or the like for the virtual printer driver, the application 101 provides print instructions as in a case of providing print instructions to the second printer driver 105. As a result, the application 101 issues a normal command to thereby provide print instructions to the first printer driver 102, so that the application can provide instructions to generate intermediate data and store the intermediate data (spool file 103). Thus, as the application 101, it is possible to use a general application capable of providing print instructions to a printer driver.

A storage region and a format of the spool file 103 are not particularly limited as long as the file has a form that can be read and processed by the layout software 104 to be described later. As the storage region, a Temp folder or AppData, for example, can be useful. Additionally, as the format, an XML paper specification (XPS), an enhanced metafile (EMF), and the like can be mentioned.

The layout software 104 is software for laying out image data on each page to be printed on a roll sheet placed in the printing apparatus 2. The user can check and change the layout of multiple pages to be printed on a sheet by using the layout software 104.

Under the check and instructions made by the user, the layout software 104 reads the spool file 103, displays each page image, and edits and sets the layout of each page. The layout software 104 then determines the page layout based on set information, generates image data corresponding to the page layout, and outputs the image data to the second printer driver 105.

The layout software 104 may be activated at a timing that a print command is issued in the first printer driver 102 or at a timing that the spool file 103 is created. Additionally, the layout software 104 may be activated by the first printer driver 102.

In addition, the first printer driver 102 may be selected in an automatic manner, not by the user. For example, as plug-in software for the application 101, a module that activates the layout software 104 may be incorporated. Additionally, upon pressing of a button provided by the module on a menu screen of the application 101, the module selects the first printer driver 102 in the background. Subsequently, the module causes the application 101 to output print data to the first printer driver 102. Further, the module may activate the layout software 104, and the activated layout software 104 may read out intermediate data from the spool file 103.

Alternatively, the user may perform operation (for example, operation for an OS) to activate the layout software 104 and also perform operation for the activated layout software 104, thereby loading printing target data generated with the application 101. Additionally, in response to the loading of the data, the layout software 104 may output the data to the first printer driver 102 under the user's instructions or in an automatic manner.

The second printer driver 105 performs predetermined image processing on the image data generated by the layout software 104, that is, the image data that is in a state where each page is laid out. This generates print data that can be printed by a printing apparatus. The generated print data is transferred to the printing apparatus 2, which then prints an image on a roll sheet in accordance with the received print data.

Figure 2:
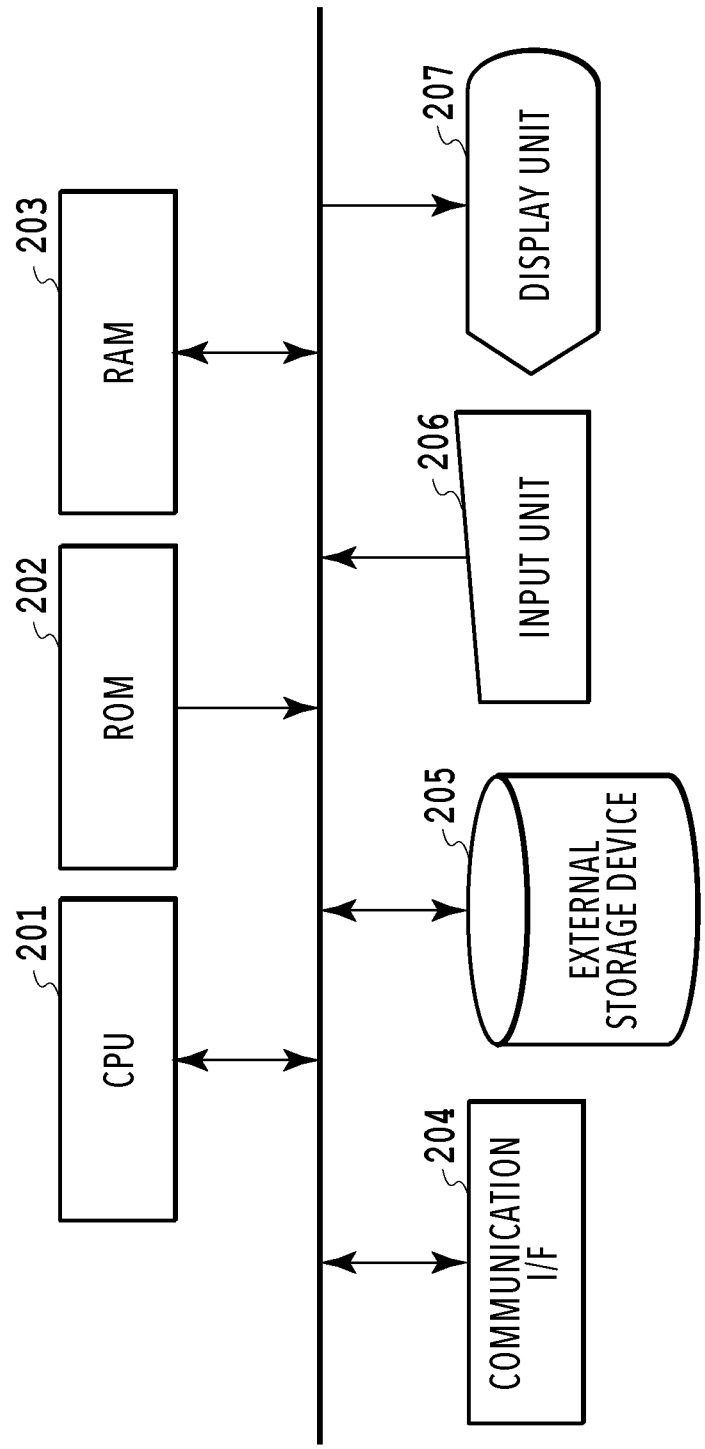
FIG. 2 is a block diagram for explaining a hardware configuration.

FIG. 2 is a block diagram for explaining the hardware configuration of the host apparatus 1. In accordance with a program stored in a ROM 202 or an external storage device 205, a CPU 201 uses a RAM 203 as a work area to control the entire host apparatus 1.

The ROM 202 stores initialization programs to be executed by the CPU 201 in activation of the host apparatus 1 and various types of data. The RAM 203 is used as a main memory or a work area for the CPU 201. The external storage device 205 includes a hard disk (HDD), for example, and stores the application 101, the first printer driver 102 and the second printer driver 105, the layout software 104, and other various programs. These programs are loaded from the external storage device 205, stored in the RAM 203, and used by the CPU 201. The individual functions included in the host apparatus 1 described with reference to FIG. 1 are also achieved by the CPU 201 using the RAM 203 as a work area in accordance with the programs stored in the external storage device 205.

An input unit 206 is a unit including a keyboard and a mouse, for example. The user inputs, via the input unit 206, various commands and settings to the CPU 201. A display unit 207 includes an LCD and a CRT, for example. The display unit 207 displays the states of the various commands and the settings to the user under the control of the CPU 201. A preview screen to be described later is for receiving, via the input unit 206, instructions from the user who has checked the preview screen displayed on the display unit 207 through the CPU 201. A communication interface (I/F) 204 performs information communication with various devices externally connected, such as the printing apparatus 2, under the control of the CPU 201.

Figure 3:
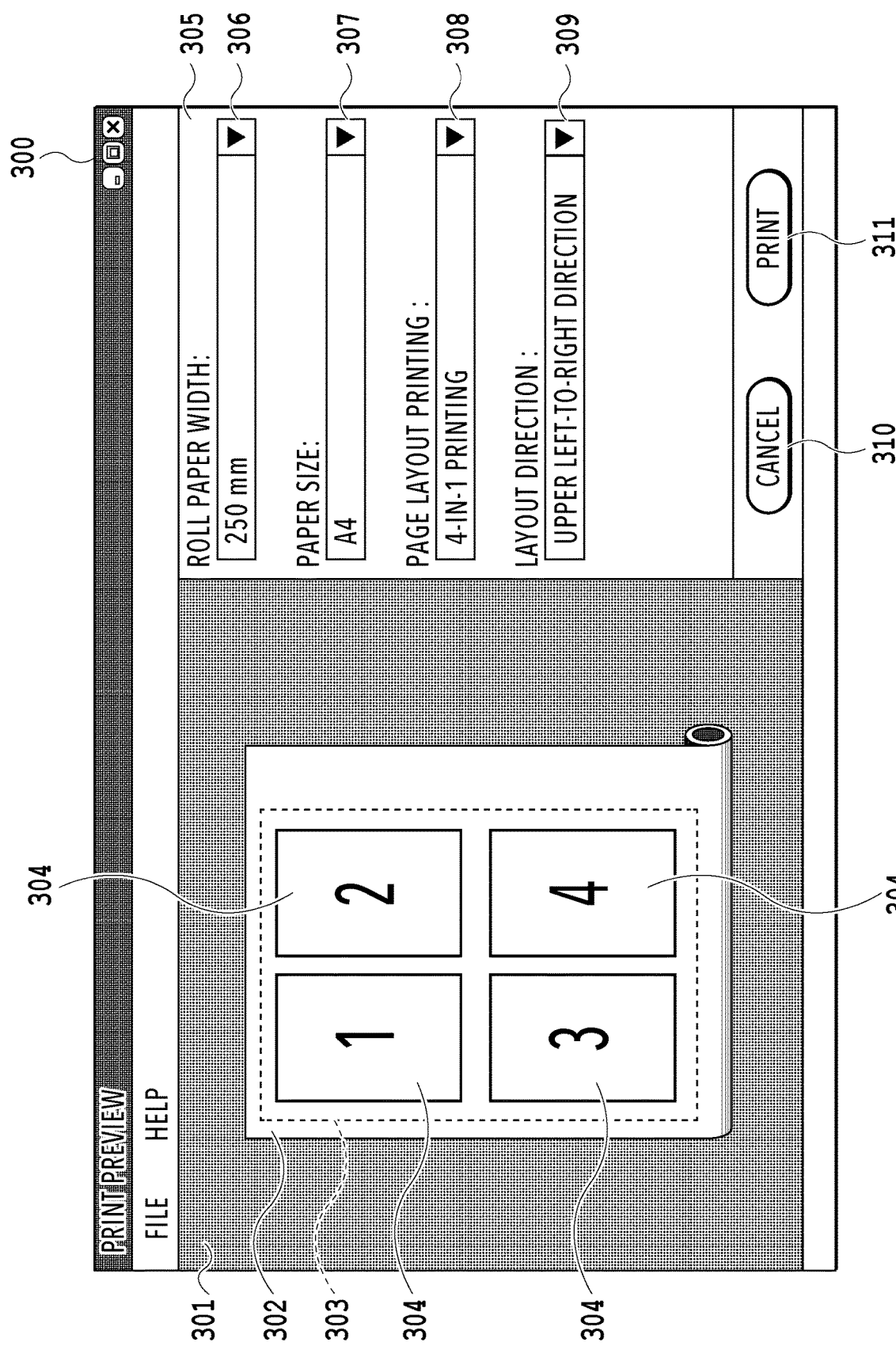
FIG. 3 shows an example of a preview screen.

FIG. 3 shows an example of a preview screen displayed by the layout software 104 on the display unit 207 (see FIG. 1) in issuance of a command for page layout printing. The layout software 104 obtains the spool file 103, then lays out image data on each page to be printed in accordance with designated setting values or default setting values, and displays a preview screen as shown in FIG. 3. Subsequently, the layout software 104 receives change instructions and print instructions from the user while displaying the current setting values on such a preview screen.

A preview screen 300 includes a display region 301 on the left side and an instruction region 305 on the right side. The display region 301 schematically shows the layout state of each page. The display region 301 shows a roll sheet region 302 representing a roll sheet to be used in the printing apparatus 2, a sheet region 303 which is within the roll sheet region 302 and in which pages are actually laid out, and a page region 304 corresponding to each of the regions of multiple pages. In this figure, a number shown in the individual page region 304 indicates which page number the page corresponds to.

A page layout shown in the display region 301 can be changed by using individual setting parts shown in the instruction region 305. A roll paper width setting part 306 is a combo box for setting the width size of roll paper to be used by the printing apparatus 2. Upon a click of the roll paper width setting part 306 by the user, the multiple width sizes of paper that can be placed in the printing apparatus 2 are displayed in a list box, and the user can select, from these multiple width sizes, the width size of roll paper to be actually used in printing. In the printing apparatus 2 according to the present embodiment, it is possible to place roll paper with a width of 250 mm and roll paper with a width of 500 mm. FIG. 3 shows a case where roll paper with a width of 250 mm is set. Incidentally, options for the width size of roll paper and information on the width size of roll paper actually placed at the current moment can be obtained by the second printer driver 105 using an API such as PrintCapabilities.

A paper size setting part 307 is a combo box for setting the size of a region for collectively printing a predetermined number of pages (the above sheet region 303). The printing apparatus 2 according to the present embodiment is a relatively large printing apparatus having a roll sheet placed therein, and a roll sheet after printing is cut for each sheet region 303. That is, products outputted by the printing apparatus 2 are one or more sheets having a size set by the paper size setting part 307. Upon a click of the paper size setting part 307 by the user, multiple paper sizes including standard sizes such as A4 size and JIS-B4 size are displayed in a list box, and the user can select the desired size of paper to be outputted from these multiple sizes. Options displayed in the list box can be obtained by the second printer driver 105 using an API such as PrintCapabilities.

In the present embodiment, the roll sheet region 302 is displayed so that the roll sheet conveying direction corresponds to the upward direction of the preview screen regardless of the size and type of roll paper, and then the sheet region 303 is set by default so that its orientation can be adjusted and changed depending on a combination of a roll paper width set by the roll paper width setting part 306 and a paper size set by the paper size setting part 307.

Figure 4:
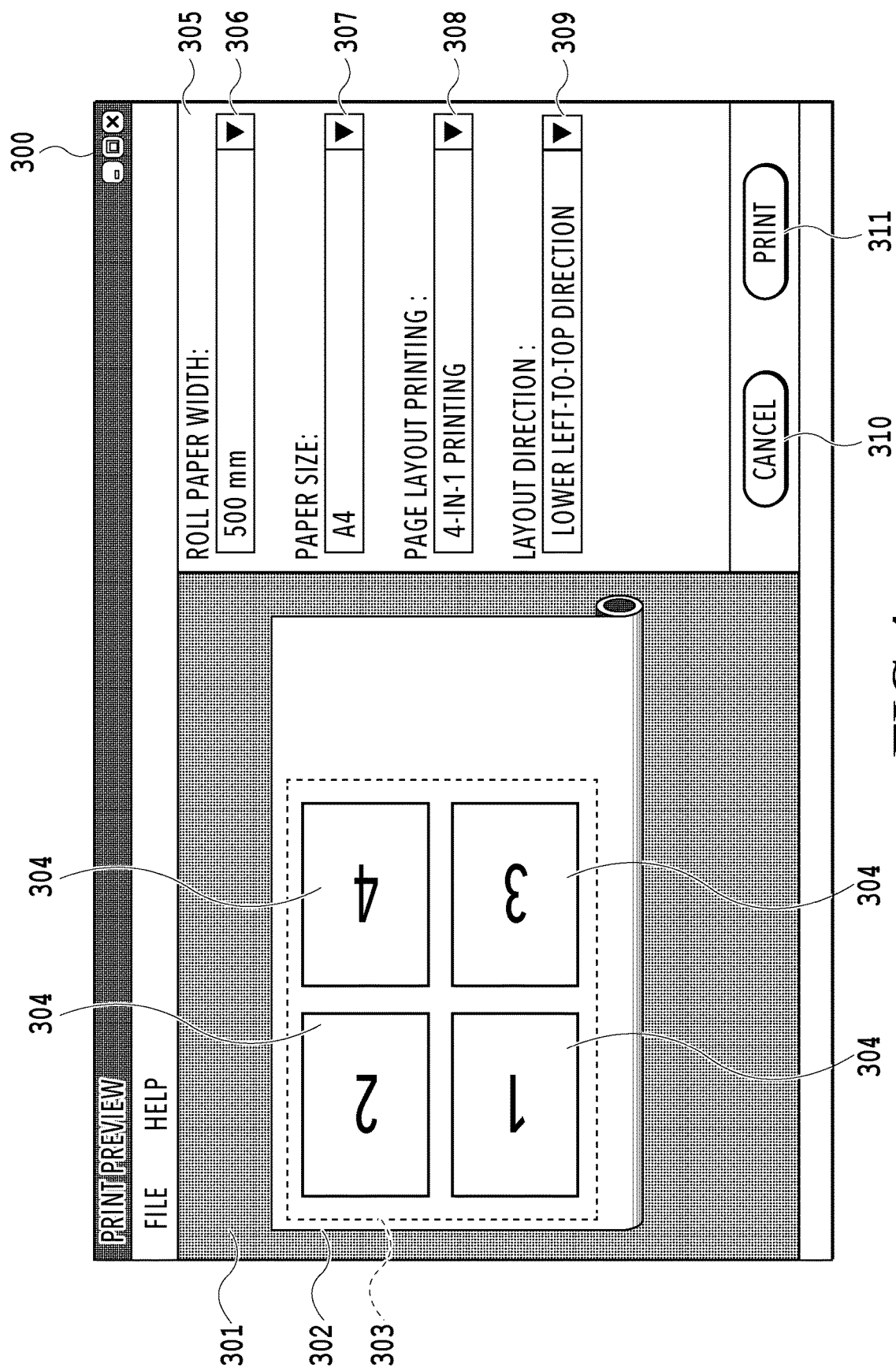
FIG. 4 shows another example of the preview screen.

For example, in a case where the length of a paper size in the longitudinal direction (in a case of A4, a longitudinal length of 297 mm) is longer than the roll paper width (for example, 250 mm), the sheet region 303 is displayed by default so that the longitudinal direction of the sheet region 303 (the longitudinal direction of A4) is identical to the roll sheet conveying direction as shown in FIG. 3. Meanwhile, in a case where the length of a paper size in the longitudinal direction (the longitudinal length of A4) is shorter than the roll paper width (500 mm), the sheet region 303 is displayed by default so that the longitudinal direction of the sheet region 303 (the longitudinal direction of A4) is identical to the width direction of the roll sheet as shown in FIG. 4.

That is, the layout software 104 determines the printing direction of the sheet region 303 with respect to the roll sheet based on the roll paper width set by the roll paper width setting part 306 and the paper size set by the paper size setting part 307. In other words, the printing direction of each of the allocation target pages with respect to the roll sheet is automatically determined. Specifically, the layout software 104 performs automatic switching as to whether or not the sheet region 303 is to be rotated 90 degrees with respect to the roll sheet depending on whether or not the longitudinal-direction length of the sheet region 303 (the longitudinal-direction length of the set paper size) is longer than the set roll paper width. Subsequently, the 90-degree rotation is reflected in the roll sheet region 302 of the print preview screen.

This aims to reduce the consumed amount of roll paper and the amount of waste roll paper after a cutting process to the smallest possible degree. As a matter of course, the above-described direction is a default, and the user can also make a change so that the longitudinal direction of the sheet region 303 is identical to the conveying direction according to the user's preference.

A page layout printing setting part 308 is a combo box for setting the number of pages to be allocated to the sheet region 303. Upon a click of the page layout printing setting part 308 by the user, the types of page layout printing, such as OFF (1-in-1 printing), 2-in-1 printing, 4-in-1 printing, 6-in-1 printing, and 9-in-1 printing, are displayed in a list box. The user can select one desired type from these multiple types of page layout printing. By setting the type of page layout printing, the number of pages to be allocated to the sheet region 303 and the size of each page are determined. In the present embodiment, at the time that the above-described roll paper width, paper size, and type of page layout printing are set, a layout direction default to be described below is determined, and a page layout based on the default is displayed. FIG. 3 shows a default preview screen in a case where 4-in-1 printing is selected in the page layout printing setting part 308. In the sheet region 303, four pages are uniformly subjected to size adjustment and then laid out.

A layout direction setting part 309 is a combo box for setting a direction in which each of multiple page regions 304 is arranged in page order in the sheet region 303. The layout direction setting part 309 is enabled in a case where the setting of the page layout printing setting part 308 is a setting other than OFF (1-in-1 printing). Upon a click of the layout direction setting part 309 by the user, the following layout directions are displayed in a list box: a direction from upper left to right, a direction from upper left to bottom, a direction from upper right to left, a direction from upper right to bottom, a direction from lower left to right, a direction from lower left to top, a direction from lower right to left, and a direction from lower right to top. The user can select one desired direction from these multiple layout directions. FIG. 3 shows a case where "4-in-1 printing" is set in the page layout printing setting part 308 and the "direction from upper left to right" is set in the layout direction setting part 309. In the sheet region 303, first to fourth pages are laid out in the following order: the upper left, the upper right, the lower left, and the lower right.

Incidentally, for example, in a case where "2-in-1 printing" is set in the page layout printing setting part 308, options displayed in the list box of the layout direction setting part 309 may be a direction from left to right, a direction from right to left, a direction from top to bottom, a direction from bottom to top, and the like.

A cancel button 310 is set in the instruction region 305 at the current moment and is a button for canceling a page layout shown in the display region 301. Upon a click of the cancel button 310 by the user, individual items shown in the instruction region 305 and the layout shown in the display region 301 are canceled and reset to defaults.

A print button 311 is set in the instruction region 305 at the current moment and is a button for causing the printing apparatus 2 to execute printing operation in accordance with the page layout shown in the display region 301. Upon a click of the print button 311 by the user, the second printer driver 105 generates print data, and in accordance with the generated print data, the printing apparatus 2 executes printing operation. By this execution, an image of the page layout shown in the display region 301 is outputted.

FIG. 4 shows a different setting example of the same preview screen 300 as in FIG. 3. As compared with FIG. 3, the setting content in the roll paper width setting part 306 is changed from 250 mm to 500 mm. In this case, the length of the paper size in the longitudinal direction (the longitudinal length of A4) is shorter than the roll paper width (500 mm), and thus, a page layout as shown in FIG. 4 is displayed by default.

Here, the display regions 301 in FIGS. 3 and 4 will be compared. In a case where the upward direction of each page region 304 is referred to as "the upward direction," first to fourth pages in both FIG. 3 and FIG. 4 are laid out in the sheet region 303 in the following order: the upper left, the upper right, the lower left, and the lower right. That is, the arrangement positions of the pages are not changed in the sheet region 303 in either state of FIGS. 3 and 4.

However, on the print preview screen, the entire sheet region 303 in FIG. 4 is laid out so as to be rotated from the state in FIG. 3. Thus, on the print preview screen, the top, bottom, left, and right relationship of the arrangement positions among multiple pages is different between the states of FIGS. 3 and 4. For example, in a case where the upward direction of the actual preview screen 300 is referred to as "the upward direction," the above layout order is different between the cases of FIGS. 3 and 4. That is, in FIG. 3, the first to fourth pages are laid out in the following order: the upper left, the upper right, the lower left, and the lower right. Meanwhile, in FIG. 4, the first to fourth pages are laid out in the following order: the lower left, the upper left, the lower right, and the upper right. In other words, in FIG. 3, the first to fourth pages are laid out in the "direction from upper left to right," whereas in FIG. 4, the first to fourth pages are laid out in the "direction from lower left to top."

Assuming that a setting value is determined as a currently set layout direction based on page allocation positions in the sheet region 303, FIG. 3 and FIG. 4 both show the setting value "direction from upper left to right." However, assuming a case where the "direction from upper left to right" is set in FIG. 4, a relationship regarding page order and arrangement positions that is visually recognized by the user on the preview screen 300 is the "direction from lower left to top" and thus, this direction is not identical to the setting value "direction from upper left to right." Therefore, there is a possibility that the user cannot appropriately recognize the setting content of the page allocation positions. That is, there is a possibility that the user cannot easily recognize how pages are laid out in a case of what settings being made. As a result, there is a possibility that in a case where the user changes the setting content, the user cannot appropriately recognize setting content for providing desired arrangement positions.

Thus, in the present embodiment, the currently set layout direction and layout directions listed in the list box of the layout direction setting part 309 are displayed so as to be consistent with the vertical and horizontal directions of the preview screen 300 visually seen by the user in actuality. That is, the layout direction in the case of FIG. 3 is displayed as the "direction from upper left to right," whereas the layout direction in the case of FIG. 4 is displayed as the "direction from lower left to top."

Figure 5:
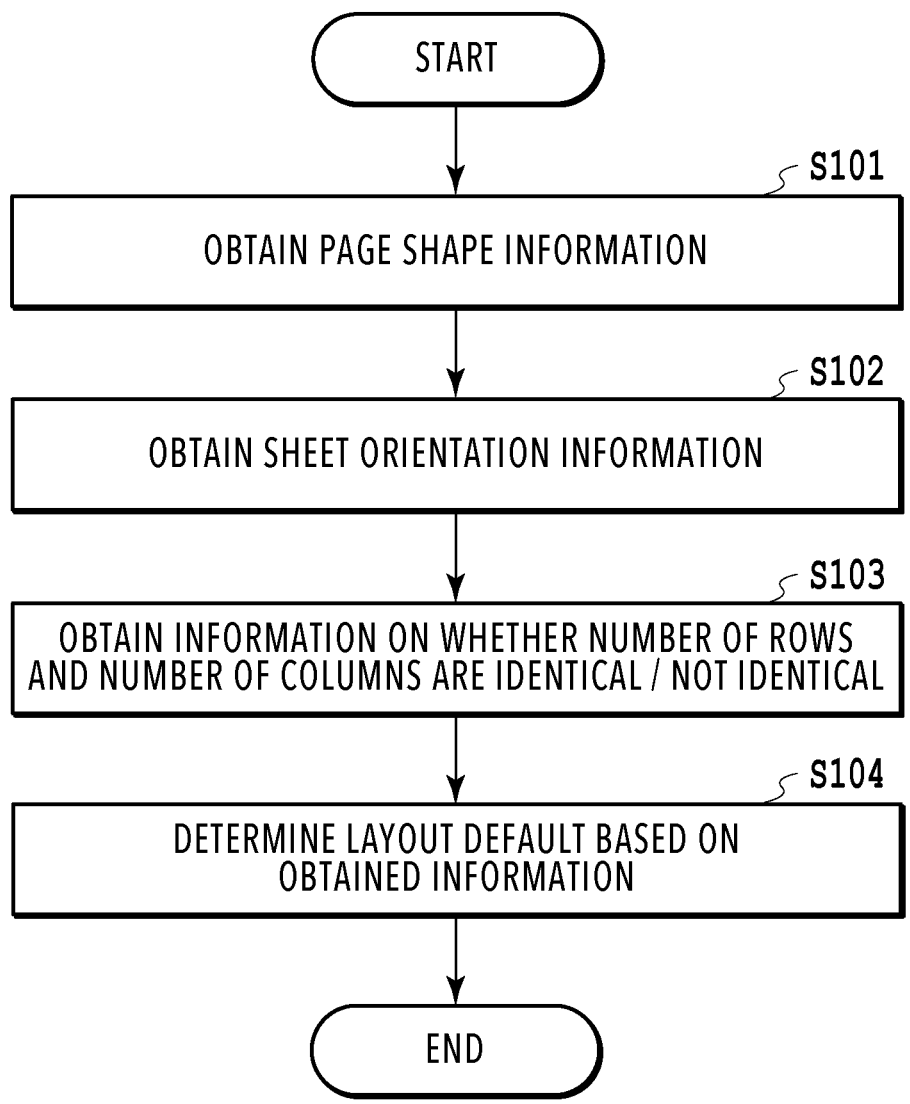
FIG. 5 is a flowchart for explaining settings for the default display form of the preview screen.

FIG. 5 is a flowchart for explaining processing which is executed by the layout software 104 according to the present embodiment and which is for determining the default display form of the layout direction on the preview screen. This processing is executed at the time that the layout software 104 is activated or at the time that setting content displayed in the instruction region 305 is changed.

Upon the start of the present processing, the layout software 104 first obtains page shape information in S101. The page shape information is information indicating whether a page to be laid out in the sheet region 303 has a vertically long shape (portrait) or a horizontally long shape (landscape). The layout software 104 may use, as page shape information, the shape of the first page of multiple pages stored in the spool file 103 or may obtain the individual shapes of the multiple pages and then use, as page shape information, a vertically long shape or a horizontally long shape, whichever is larger in number. Incidentally, in a case where the page shape is a square, the page shape information may be set to either of the vertically long shape and the horizontally long shape.

In S102, the layout software 104 obtains orientation information on the sheet region 303 in the display region 301. The orientation information in the case of FIG. 3 is a portrait orientation, and the orientation information in the case of FIG. 4 is a landscape orientation. The orientation of the sheet region 303 as described above is set according to the setting content of the roll paper width setting part 306, the setting content of the paper size setting part 307, and the user's instructions. For example, the layout software 104 compares a roll paper width indicated by a setting of the roll paper width setting part 306 with the transverse-direction length and longitudinal-direction length of a paper size indicated by a setting of the paper size setting part 307. Subsequently, in a case where the roll paper width is longer than the transverse-direction length of the paper size and shorter than the longitudinal-direction length of the paper size, it is determined that the orientation of the sheet region 303 is the "portrait orientation" (orientation shown in FIG. 3). Additionally, in a case where the roll paper width is longer than the longitudinal-direction length of the paper size, it is determined that the orientation of the sheet region 303 is the "landscape orientation" (orientation shown in FIG. 4). Incidentally, in a case where the sheet region 303 has a square shape, the orientation information on the sheet region 303 may be set to either of the portrait orientation and the landscape orientation. Additionally, in a case where the roll paper width is shorter than the transverse-direction length of the paper size, the layout software 104 may display an error screen. Alternatively, to prevent such a setting from being made, settings of the roll paper width setting part 306 and the paper size setting part 307 may be controlled.

In S103, the layout software 104 determines, in the sheet region 303 of the preview screen, whether the number of the page regions 304 arranged in the longitudinal direction is identical to the number of the page regions 304 arranged in the transverse direction or is not identical thereto. The number of the regions arranged in the longitudinal direction and the number of the regions arranged in the transverse direction are determined depending on a combination of the setting content of the paper size setting part 307 and the setting content of the page layout printing setting part 308. For example, in a case where "6-in-1 printing" is set in the page layout printing setting part 308, the page regions 304 are laid out in column 3×row 2 or column 2×row 3, and thus, it is determined in S103 that the numbers are "not identical." Additionally, for example, in a case where "4-in-1 printing" is set in the page layout printing setting part 308, the regions may be laid out in column 2×row 2 as shown in FIGS. 3 and 4, but in a case where an elongate sheet is set in the paper size setting part 307, the regions may be laid out in column 1×row 4 or column 4×row 1. In the former case, it is determined in S103 that the numbers are identical, and in the latter case, it is determined that the numbers are not identical.

In S104, the layout software 104 determines the default display form of a layout direction as either the "direction from upper left to right" or the "direction from lower left to top" based on the information obtained in S101 to S103.

FIG. 6 shows a correspondence between the default display form of a layout direction and the obtained information in S101 to S103, which is referred to by the layout software 104 in S104 of FIG. 5, and either the "direction from upper left to right" or the "direction from lower left to top" is determined in association with each of combinations of the page shape information obtained in S101, the sheet orientation information obtained in S102, and the information on identicalness/non-identicalness obtained in S103.

In the present embodiment, even in any combination of the pieces of information obtained in S101 to S103, the default layout is a layout in which individual pages are arranged in the "direction from upper left to right" in a state where the upward direction of the page region 304 is identical to the upward direction of the sheet region 303. This is a normal layout direction in general page layout printing.

Figure 8A:
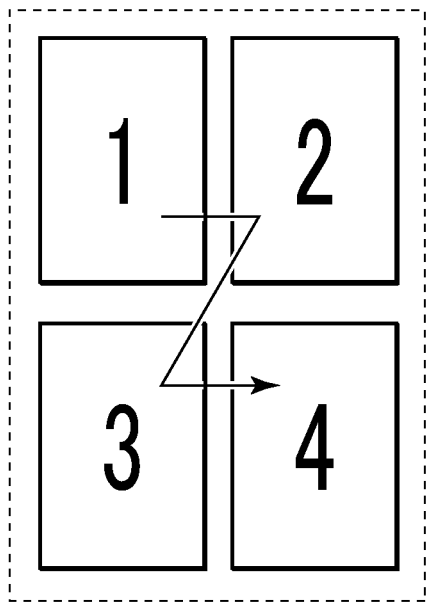
FIGS. 8A to 8D each show a page layout example.
Figure 8B:
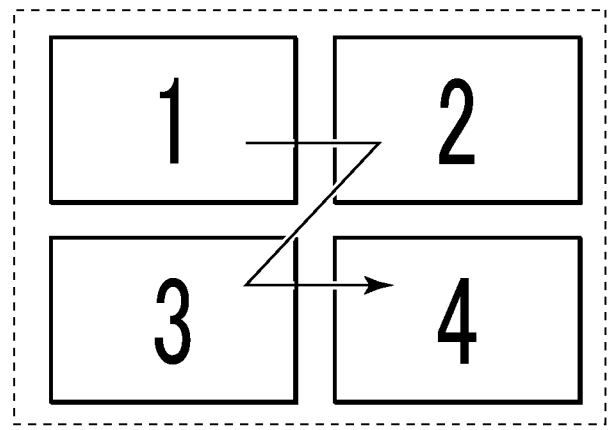
Figure 8C:
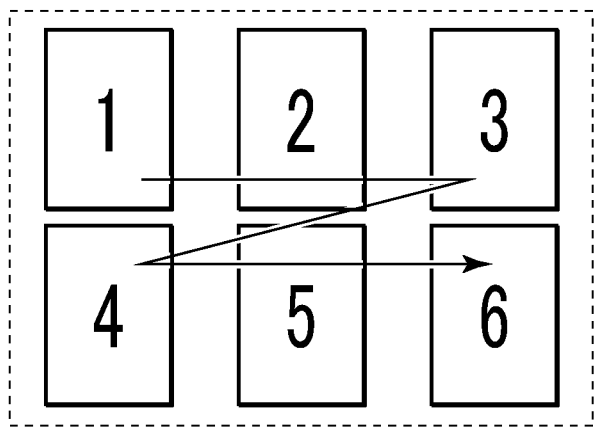
Figure 8D:
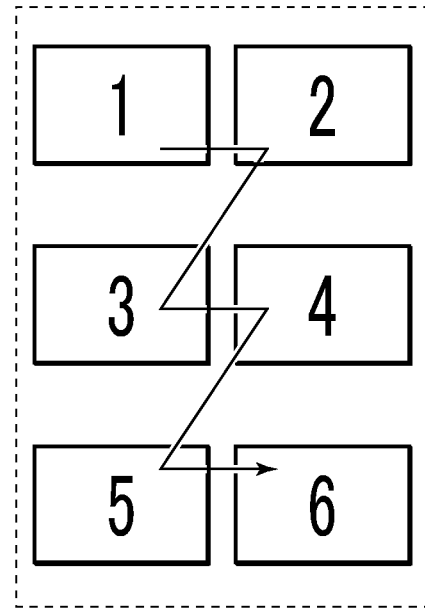

FIGS. 8A to 8D show layout examples of page regions 304 with respect to a sheet region 303 in a case where three pieces of information described above are various pieces of information. FIG. 8A shows a page layout example in a case where the page shape information is a vertically long shape, the sheet orientation information is a portrait orientation, and the number of the regions arranged in the longitudinal direction is identical to the number of the regions arranged in the transverse direction. FIG. 8B shows a page layout example in a case where the page shape information is a horizontally long shape, the sheet orientation information is a landscape orientation, and the number of the regions arranged in the longitudinal direction is identical to the number of the regions arranged in the transverse direction. FIG. 8C shows a page layout example in a case where the page shape information is a vertically long shape, the sheet orientation information is a landscape orientation, and the number of the regions arranged in the longitudinal direction is not identical to the number of the regions arranged in the transverse direction. FIG. 8D shows a page layout example in a case where the page shape information is a horizontally long shape, the sheet orientation information is a portrait orientation, and the number of the regions arranged in the longitudinal direction is not identical to the number of the regions arranged in the transverse direction. Even in any case shown in FIGS. 8A to 8D, the default in the present embodiment is a layout in which the multiple page regions 304 are arranged with respect to the sheet region 303 in page order in the "direction from upper left to right."

In addition, in a case where the upward direction of the sheet region 303 is identical to the roll sheet conveying direction, a page layout is displayed in an orientation as shown in FIGS. 8A to 8D also on the preview screen. Thus, the "layout direction" default is also set to the "direction from upper left to right." Meanwhile, in a case where the upward direction of the sheet region 303 is not identical to the roll sheet conveying direction, a page layout is displayed so that the upward direction of the sheet region 303 is identical to the left direction of the roll sheet, that is, in the orientation of a page layout in FIGS. 8A to 8D rotated 90 degrees counterclockwise. Thus, the "layout direction" default is set to the "direction from lower left to top." That is, in the present embodiment, the layout direction default is determined based on the information obtained in S101 to S103 so as to be the "direction from upper left to right" in a case where the upward direction of the sheet region 303 is identical to the roll sheet conveying direction and so as to be the "direction from lower left to top" in a case where the directions are not identical. Through the above steps, processing for determining the default display form of a layout direction described using FIG. 5 is ended.

Subsequently, the above processing is performed each time the user changes the setting content of the roll paper width setting part 306, the paper size setting part 307, and the page layout printing setting part 308. The default display form in the layout direction setting part 309 is then changed based on a new setting.

As described above, in the present embodiment, a layout direction indicated by the layout direction setting part 309 is represented on a preview screen in a case of performing page layout printing so as to be consistent with the vertical and horizontal directions of the preview screen. This enables the user to correctly grasp and appropriately customize the page layout default in page layout printing.

Other Embodiments

In the above description, although an embodiment as an example has been described, the content of the above embodiment can be variously changed and applied as necessary.

For example, a default in the above embodiment is a state where pages are laid out in page order in the direction from upper left to right with respect to the sheet region 303 in line with general page layout printing, but the default layout direction is not limited to this. For example, another direction such as a direction from upper left to bottom with respect to the sheet region 303 may be a default.

Additionally, in S102 of FIG. 5, one piece of orientation information common to multiple pages stored as the spool file 103 is obtained, but the page orientation information may be set for each sheet region 303. For example, four initial pages are each processed as a vertically long image as shown in FIG. 8A and four subsequent pages are each processed as a horizontally long image as shown in FIG. 8B; that is, the orientation information may be changed for each sheet region. In this case, the layout direction is selected as "custom," and the layout direction may be set for each sheet region.

Figure 7:
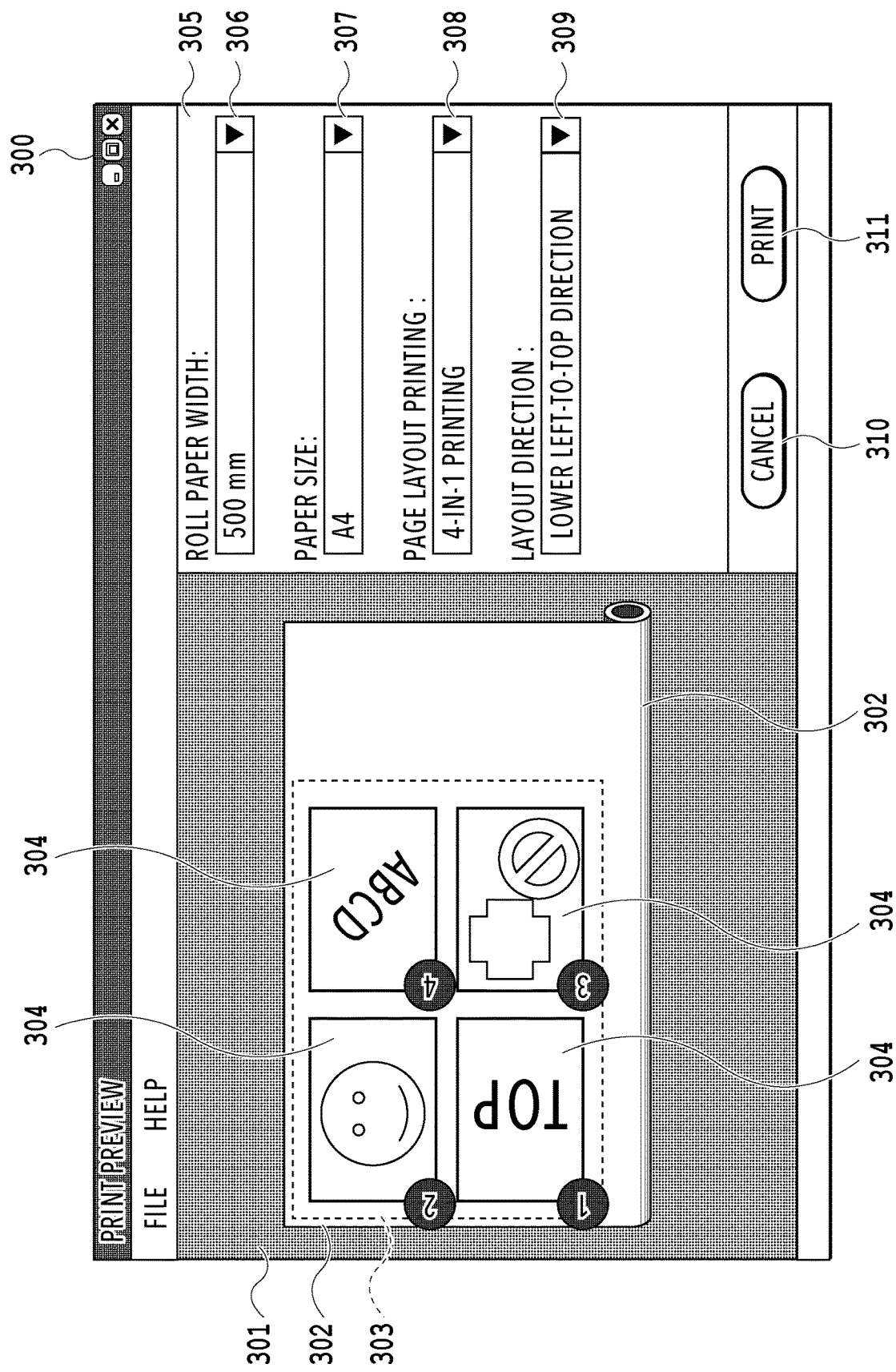
FIG. 7 shows still another example of the preview screen.

Additionally, as shown in FIGS. 3 and 4, a number is added to the inside of each page region 304 so that the page number and orientation can be understood for explanatory convenience, but on an actual preview screen, actual images stored in the spool file 103 are displayed. In this case, even on a preview screen displayed as shown in FIGS. 3 and 4, it is difficult for the user to correctly grasp the orientation of each page and a correspondence between the representation of the layout direction setting part 309 and the page layout in the display region 301. In such a case, by adding the page number of each page to each page region 304 according to the orientation of each page in the top-to-bottom direction as shown, for example, in FIG. 7, the user can correctly grasp a correspondence between the page numbers and the layout direction. Additionally, in place of the page numbers or in addition to the page numbers, an arrow representing page order (arrows provided for the sake of explanation in FIGS. 8A to 8D) may be displayed in the sheet region 303 on the preview screen.

Additionally, as with the "upward direction" in the case of FIG. 3 and the "left direction" in the case of FIG. 4, information on the "direction of each page" may be displayed in an instruction region. In this case, the information on the "direction of each page" is also information on a layout direction displayed in a state where the direction of each page is consistent with the vertical and horizontal directions of the preview screen, like the layout direction in the above embodiment.

In the embodiment described above, descriptions have been given on the premise that the printing apparatus performs printing on a roll sheet (continuous sheet), but the above embodiment is applicable also to a case where the printing apparatus performs printing on a cut sheet. For example, in a case where the orientation of the sheet region is set to a landscape orientation in a printing apparatus capable of conveying a standard cut sheet only in the longitudinal direction, the upward direction of the sheet region is not identical to the conveying direction. In such a case, the layout direction indicated by the layout direction setting part is made consistent with the vertical and horizontal directions of the preview screen, thereby enabling the user to correctly grasp the page layout default in page layout printing.

Incidentally, in the above embodiment, descriptions have been given of a method for determining a page layout and a value that is being set in the layout direction setting part 309 in a print preview in a case where the layout software 104 is activated. However, the embodiment is not limited to this, and it is possible to determine a page layout in a print preview in a case where various settings are changed in accordance with instructions provided by the user in the instruction region 305. Also in this case, as shown in FIGS. 3 and 4, the relationship of arrangement positions among pages as indicated by the layout direction setting part 309 is made identical to the relationship of arrangement positions among pages in the print preview. As processing therefor, the layout software 104 executes processing for determining page arrangement in a case where the user changes the setting content of any of the setting items of the roll paper width setting part 306, the paper size setting part 307, the page layout printing setting part 308, and the layout direction setting part 309. Specifically, the layout software 104 determines, based on a combination of setting content in those setting items after change, the number of pages and the orientation, size, and arrangement position of each page region in the print preview and print data arranged in each page region. Subsequently, the layout software 104 displays the print preview based on data that is an actual printing target in accordance with the determination.

Incidentally, as processing for determining the number of pages and the orientation, size, and arrangement position of each page in the print preview, first, processing as shown in S101 to S103 of FIG. 5 is performed. Subsequently, based on the results and a setting in the layout direction setting part 309, the number of pages and the orientation, size, and arrangement position of each page region in the print preview are determined. Additionally, in accordance with a setting value in the layout direction setting part 309, printing target data to be arranged in each page region is determined. As such processing for determining the number of pages and the orientation, size, and arrangement position of each page in the print preview, it is possible to prepare a table showing the position, size, and orientation of each page region and data to be arranged in the page region that correspond to various settings. In this case, the table shows page layouts in the print preview that correspond to all combinations of setting values of multiple setting items. Additionally, regarding any of the page layouts, the table is prepared so that the relationship of arrangement positions among pages as indicated by the layout direction setting part 309 is identical to the relationship of arrangement positions among pages in the print preview. Incidentally, in the above embodiment, descriptions have been given of the content in which the layout software 104 is activated by creation of the spool file 103 and the layout software 104 uses the spool file 103 to prepare a preview screen, but the present invention is not limited to this. For example, in performing page layout printing, the user may activate the layout software and then provide, to the layout software, image data such as a bitmap or TIFF prepared preliminarily. In this case, the layout software uses the image data such as a bitmap or TIFF provided by the user to prepare a preview screen, and creation of a spool file as intermediate data is not an essential requisite.

In the above embodiment, the second printer driver 105 can be set by various methods. For example, a field for setting the second printer driver may be added to the preview screens shown in FIGS. 3 and 4, or the embodiment may be designed so as to enable the second printer driver to be set on a UI screen of the first printer driver 102. Additionally, in FIG. 1, the first printer driver 102 and the second printer driver 105 have been described as distinct printer drivers having different functions, but these can also be the same printer drivers each of which can achieve two functions. In this case, setting the second printer driver 105 is not needed.

Additionally, in the above embodiment, the setting content of each of various setting items is displayed as the instruction region 305 within the print preview screen. However, the embodiment is not limited to this, and it is also possible to display the setting content of each of the setting items on another setting screen not shown.

The object of the present invention can be achieved also by preparing a storage medium storing software program code that achieves the functions of the embodiments described above. That is, the program code stored in the storage medium is provided to a system or apparatus, and the computer (or CPU or MPU) of the system or apparatus reads out and executes the program code stored in the storage medium, thereby achieving the object. In this case, the program code read out from the storage medium achieves the functions of the embodiments described above, and the storage medium storing the program code constitutes the present invention.

As a storage medium for providing program code, it is possible to use, for example, a flexible disk, a hard disk, an optical disk, a magnetic optical disc, a CD-ROM, a CD-R, magnetic tape, a nonvolatile memory card, a ROM, and a DVD. The invention also includes a case where on the basis of the instructions of the program code read out by the computer, an operating system or the like that runs on the computer performs part or the whole of actual processing and the functions of the embodiments described above are achieved by the processing.

It is also possible to interpose a step in which the program code read out from the storage medium is written onto a memory included in a function expansion board inserted into the computer or a function expansion unit connected to the computer. In this case, based on the instructions of the program code, a CPU or the like included in the function expansion board or function expansion unit performs part or the whole of actual processing, and the functions of the embodiments described above are achieved by the processing.

Embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-121706, filed Jun. 28, 2019, which is hereby incorporated by reference wherein in its entirety.

What is claimed is:

1. A control apparatus comprising:
a display unit configured to display on a display device a predetermined region indicating a print medium; and
one or more processors operating as a plurality of units comprising:
(1) a first changing unit configured to change, in a state where multiple regions indicating multiple pages are shown in the predetermined region, based on performing a first user operation to change a setting in a first setting item, orientations of the multiple regions shown in the sheet predetermined region with respect to a predetermined direction of the print medium; and
(2) a second changing unit configured to change, in the state where the multiple regions are shown in the predetermined region, a positional relationship among the multiple regions in the predetermined region based on performing a second user operation to change a setting in a second setting item,
wherein orientations of the multiple regions, the positional relationship among the multiple regions, and the setting in the second setting item are changed based on the performing of the first user operation to change the setting of the first setting item.

2. A control method comprising:
a display step of displaying on a display device a predetermined region indicating a print medium;
a first changing step of changing, in a state where multiple regions indicating multiple pages are shown in the predetermined region, based on performing a first user operation to change a setting of a first setting item, orientations of the multiple regions shown in the predetermined region with respect to a predetermined direction of the print medium; and
a second changing step of changing, in the state where the multiple regions are shown in the predetermined region, a positional relationship among the multiple regions in the predetermined region based on performing a second user operation to change a setting of a second setting item,
wherein orientations of the multiple regions, the positional relationship among the multiple regions, and the setting in the second setting item are changed based on the performing of the first user operation to change the setting in the first setting item.

3. The control method according to claim 2, wherein among multiple display items representing setting content of the second setting item, a display item corresponding to setting content in the second setting item is displayed on the display device, and
wherein the setting content in the second setting item is changed based on the performing of the first user operation to change the setting in the first setting item, and a display item corresponding to setting content of the second setting item after the change is displayed on the display device.

4. The control method according to claim 2, wherein a display item including text representing a page order of the multiple regions is displayed on the display device.

5. The control method according to claim 2, wherein the first setting item is a setting item relating to a size of a sheet region included in the predetermined region and corresponding to a predetermined sheet size, and the multiple regions are shown in the sheet region.

6. The control method according to claim 2, wherein the first setting item is a setting item relating to a size of the print medium.

7. The control method according to claim 2, wherein the print medium is roll paper, and
wherein the first setting item is a setting item relating to a width of the roll paper.

8. The control method according to claim 2, wherein the setting of the second setting item is changed based further on performing a third user operation to change at least one of the number of the multiple regions included in the predetermined region and the orientation of each of the multiple regions with respect to the predetermined direction of the print medium.

9. The control method according to claim 2, wherein the predetermined direction is a conveying direction of the print medium in a printing apparatus that executes printing according to a layout shown in the predetermined region.

10. The control method according to claim 2, wherein a page number is added to each of the multiple regions that are displayed.

11. The control method according to claim 2, wherein the print medium is a roll paper.

12. The control method according to claim 2, wherein the predetermined region is displayed so that a conveying direction of the print medium by a printing apparatus, which executes printing according to a layout shown in the predetermined region, corresponds to an upward direction of the predetermined region.

13. The control method according to claim 2, wherein the predetermined region includes a sheet region corresponding to a predetermined sheet size, and in a case where a length of the sheet region in a longitudinal direction is longer than a width of the print medium, the sheet region is displayed so that the longitudinal direction of the sheet region corresponds to a conveying direction of the print medium by a printing apparatus that executes printing according to a layout shown in the predetermined region.

14. The control method according to claim 13, wherein the first setting item is a setting item relating to a width of the print medium, and
wherein, in a case where the first user operation to change the setting of the first setting item is performed so that the length of the sheet region in the longitudinal direction is changed from a state where the length is longer than the width of the print medium to a state where the length is shorter than the width of the print medium, the orientations of the multiple regions with respect to the predetermined direction of the print medium are changed.

15. The control method according to claim 14, wherein in a case where the first user operation to change the setting of the first setting item is performed so that the length of the sheet region in the longitudinal direction is shorter than the width of the print medium, an orientation of the sheet region with respect to the predetermined direction of the print medium is changed.

16. The control method according to claim 13, wherein the multiple regions are displayed so that the longitudinal direction of the sheet region corresponds to the longitudinal direction of the multiple regions.

17. The control method according to claim 2, wherein the predetermined region includes a sheet region corresponding to a predetermined sheet size, and in a case where a length of the sheet region in a longitudinal direction is shorter than a width of the print medium, the sheet region is displayed so that a transverse direction of the sheet region corresponds to a conveying direction of the print medium by a printing apparatus that executes printing according to a layout shown in the predetermined region.

18. The control method according to claim 2, wherein the second setting item is an item for setting a direction to arrange the multiple regions in page order.

19. The control method according to claim 18, wherein the second setting item includes at least one of a direction from upper left to right, a direction from upper left to bottom, a direction from upper right to left, a direction from upper right to bottom, a direction from lower left to right, a direction from lower left to top, a direction from lower right to left, and a direction from lower right to top.

20. The control method according to claim 19, wherein an upward direction of the second setting item corresponds to an upward direction of the predetermined region.

21. The control method according to claim 2, wherein a direction of the multiple regions, the positional relationship among the multiple regions, and the setting of the second setting items are changed based on setting of a page layout printing and performing the first user operation to change the setting in the first setting item.

22. The control method according to claim 2, further comprising an execution step of executing processing related to print data for causing a printing apparatus to print according to a layout shown in the predetermined region.

23. The control method according to claim 22, wherein the processing related to the print data is at least one of processing for generating the print data and processing for transferring the print data to the printing apparatus.

24. A non-transitory computer-readable storage medium storing a program that causes a computer to function as units of a control apparatus, the control apparatus comprising:
a display unit configured to display on a display device a predetermined region indicating a print medium;
a first changing unit configured to change, in a state where multiple regions indicating multiple pages are shown in the predetermined region, based on performing a first user operation to change a setting in a first setting item, orientations of the multiple regions shown in the predetermined region with respect to a predetermined direction of the print medium; and
a second changing unit configured to change, in the state where the multiple regions indicating the multiple pages are shown in the predetermined region, a positional relationship among the multiple regions on the predetermined region based on performing a second user operation to change a setting in a second setting item,
wherein orientations of the multiple regions, the positional relationship among the multiple regions, and the setting in the second setting item are changed based on the performing of the first user operation to change the setting of the first setting item.

* * * * *